(12) United States Patent
Chen et al.

(10) Patent No.: US 8,407,487 B2
(45) Date of Patent: Mar. 26, 2013

(54) ELECTRONIC DEVICE AND METHOD FOR SECURITY MONITORING THEREOF

(75) Inventors: Yang-Yuan Chen, Taipei Hsien (TW); Ming-Chih Hsieh, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 299 days.

(21) Appl. No.: 12/859,269

(22) Filed: Aug. 19, 2010

(65) Prior Publication Data

US 2011/0107114 A1    May 5, 2011

(30) Foreign Application Priority Data

Oct. 29, 2009    (CN) .......................... 2009 1 0309052

(51) Int. Cl.
*G06F 11/30* (2006.01)

(52) U.S. Cl. ........ 713/193; 713/189; 713/190; 713/191; 713/192; 713/194; 711/163; 711/164; 726/1; 726/2; 726/22; 726/26; 726/34

(58) Field of Classification Search .......... 713/189–194; 726/1–36; 711/163–164
See application file for complete search history.

(56) References Cited

U.S. PATENT DOCUMENTS

| | | | |
|---|---|---|---|
| 2007/0198856 A1* | 8/2007 | Lee et al. | 713/190 |
| 2008/0086655 A1* | 4/2008 | Shipton et al. | 713/503 |
| 2008/0127348 A1* | 5/2008 | Largman et al. | 726/24 |
| 2009/0228639 A1* | 9/2009 | Cho | 711/103 |

* cited by examiner

*Primary Examiner* — Edan Orgad
*Assistant Examiner* — Roderick Tolentino
(74) *Attorney, Agent, or Firm* — Altis Law Group, Inc.

(57) ABSTRACT

A method for security monitoring of an electronic device includes determining whether a storage system of the electronic device is a secured storage system according to a signal of a first switch of the electronic device, determining whether an encryption key of the secured storage system is modifiable according to a detected signal of a second switch of the electronic device. Decrypting the secured storage system using a decryption key if the decryption key is the same as a preset decryption key in the secured storage system.

18 Claims, 4 Drawing Sheets

| swich / signal | First DIP swich | Second DIP swich |
|---|---|---|
| High level | Support an secured storage system | Do not allow to modify an encryption key of the storage system |
| Low level | Do not support the secured storage system | Allow to modify the encryption key of the storage system |

FIG. 4

ELECTRONIC DEVICE AND METHOD FOR SECURITY MONITORING THEREOF

BACKGROUND

1. Field of the Disclosure

Embodiments of the present disclosure relate to security monitoring, and particularly to an electronic device and a method for security monitoring of the electronic device.

2. Description of Related Art

Presently, a webcam provides an interface to connect a storage device, such as a hard disk drive, a random access memory, a read only memory, a cache system, or a combination of the aforementioned hardware. The webcam can be used for security monitoring or common monitoring. However, the webcam for security monitoring, in general, may be accessed by users without authentication.

BRIEF DESCRIPTION OF THE DRAWINGS

FIG. 4 is a schematic diagram illustrating a truth table of DIP switches and signals.

DETAILED DESCRIPTION

All of the processes described below may be embodied in, and fully automated via, functional code modules executed by one or more general purpose computers or processors. The code modules may be stored in any type of computer-readable medium or other computer storage device. Some or all of the methods may alternatively be embodied in specialized computer hardware.

Figure 1:
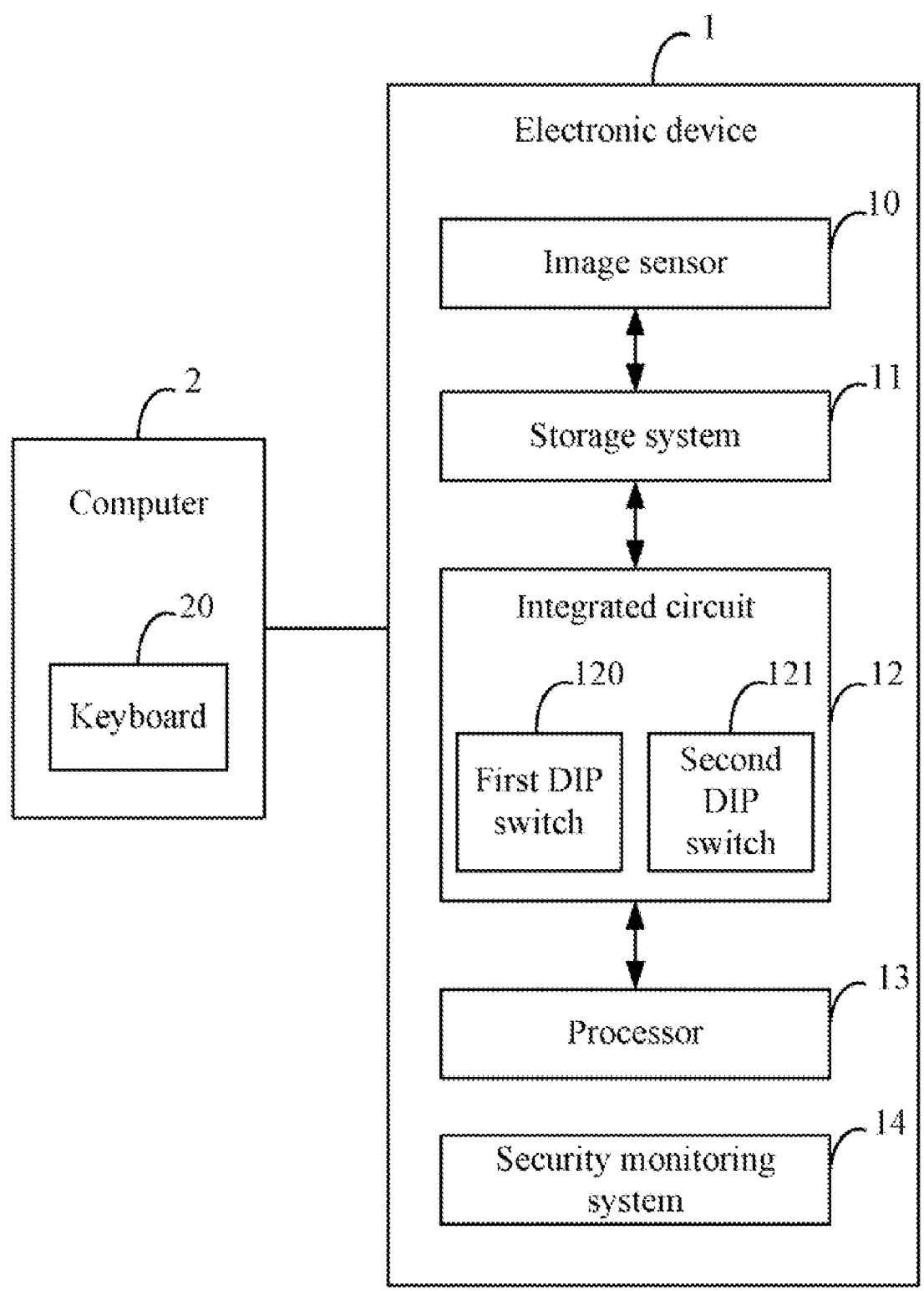
FIG. 1 is a block diagram of one embodiment of an electronic device in communication with a computer.

FIG. 1 is a block diagram of one embodiment of an electronic device 1 in communication with a computer 2. In one embodiment, the electronic device 1 includes an image sensor 10, a storage system 11, an integrated circuit 12, and a security monitoring system 14. In one embodiment, the image sensor 10 is used to provide image information. The image sensor 10 may be a charge-coupled device (CCD), a CMOS (complementary metal oxide semiconductor) active-pixel sensor, or a MOSFET (metal oxide semiconductor field effect transistor).

The storage system 11 may store various kinds of data, such as images, encryption keys, and decryption keys, and so on. For example, the storage system 11 may be a smart media card, a secure digital card, a compact flash card, a multimedia card, a memory stick, and an extreme digital card. In some embodiments, the storage system 11 may be a storage device that can used to store data (hereinafter referred to as "general storage system".) or an encrypted/secured storage device that can be used to store encrypted data (hereinafter referred to as "secured storage system".)

The integrated circuit 12 includes a first DIP (dual in-line package) switch 120 and a second DIP switch 121. The first DIP switch 120 is used to determine whether the storage system 11 is the general storage system or the secured storage system. For example, if the first DIP switch 120 is turn OFF, the storage system 11 is determined to be the secured storage system. If the first DIP switch 120 is turn ON, the storage system 11 is determined to be the general storage system. The second DIP switch 121 is used to determine whether an encryption key of the secured storage system 11 is allowed to be modified by a user. For example, if the second DIP switch 120 is turn ON, the encryption key of the secured storage system 11 is allowed to be modified. If the second DIP switch 120 is turn OFF, the encryption key of the secured storage system 11 is not allowed to be modified.

The electronic device 1 also includes a processor 13. The processor 13 executes one or more computerized operations stored in the storage system 11 and other applications, to provide functions of the electronic device 1.

Figure 2:
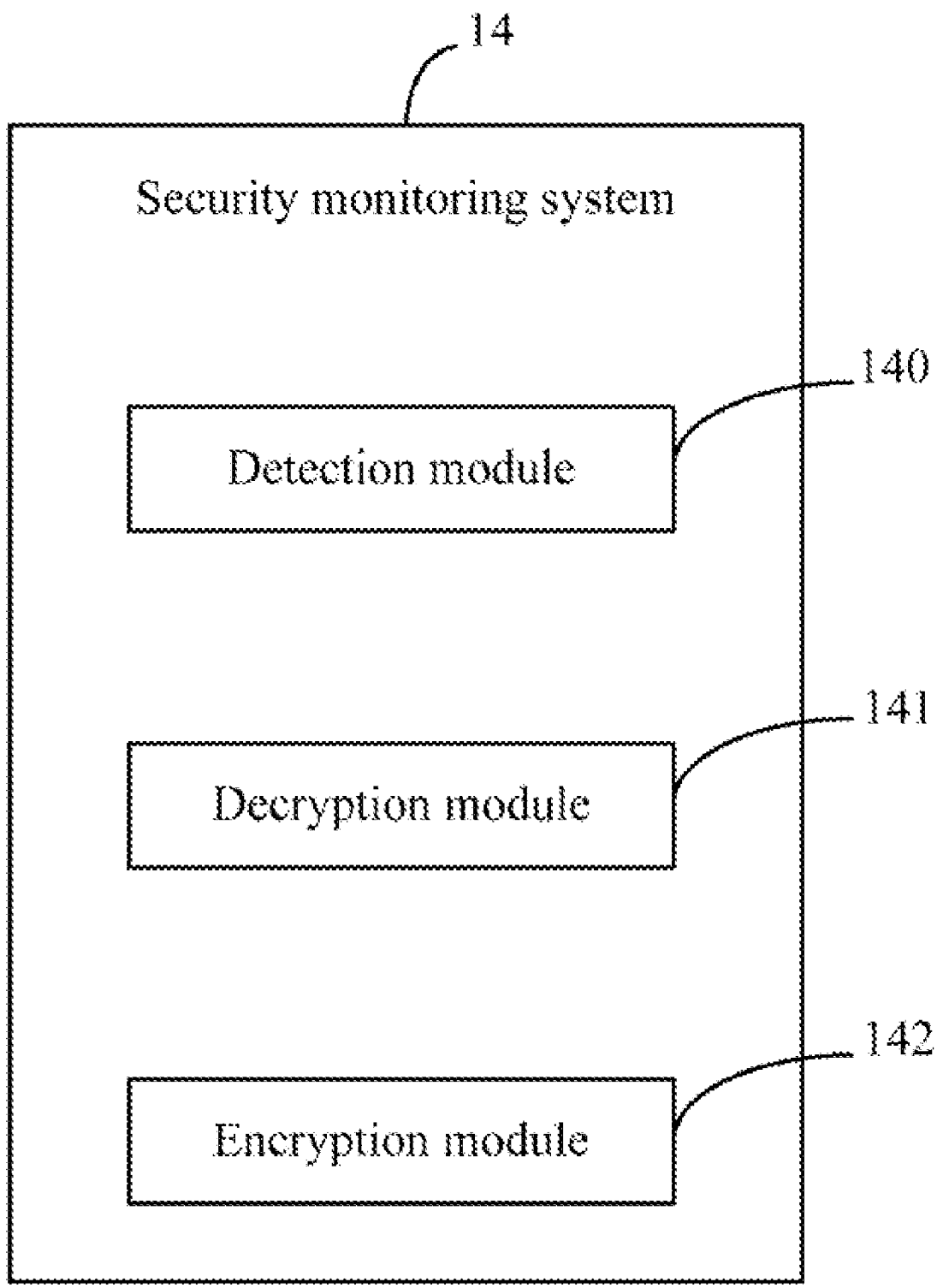
FIG. 2 is a block diagram of one embodiment of the security monitoring system in FIG. 1.

FIG. 2 is a block diagram of one embodiment of the security monitoring system 14 in FIG. 1. In some embodiments, the security monitoring system 14 includes a detection module 140, a decryption module 141, and an encryption module 142. The modules 140, 141, and 142 may comprise one or more computerized codes to be executed by the processor 13 to perform one or more operations of the electronic device 1.

The detection module 140 detects a signal of the first DIP switch 120 after the electronic device 1 is started. The signal of the first DIP switch 120 may be a high level signal or a low level signal. In some embodiments, if the first DIP switch 120 is turn OFF, the detected signal of the first DIP switch 120 is the high level signal. If the first DIP switch 120 is turn ON, the detected signal of the first DIP switch 120 is the low level signal.

The detection module 140 determines whether the storage system 11 is the secured storage system according to the detected signal of the first DIP switch 120. As shown in FIG. 4, the detection module 140 determines that the storage system 11 is the secured storage system if the detected signal of the first DIP switch 120 is the high level signal.

Upon the condition that the storage system 11 is the secured storage system, the detection module 140 further detects a signal of the second DIP switch 121 to determine whether the encryption key of the secured storage system 11 is allowed to be modified. In some embodiments, if the second DIP switch 121 is turn OFF, the detected signal of the second DIP switch 121 is the high level signal. If the second DIP switch 121 is turn ON, the signal of the second DIP switch 121 is the low level signal.

For example, as shown in FIG. 4, the detection module 140 determines that the encryption key of the secured storage system 11 is modifiable if the signal of the second DIP switch 121 is the low level signal. The detection module 140 determines that the encryption key of the secured storage system 11 is not modifiable if the signal of the second DIP switch 121 is the high level signal.

Upon receiving a decryption key input by the user to decrypt the secured storage system 11, the decryption module 141 determines whether the received decryption key is valid. The decryption key may be input by the user through the keyboard 20 of the computer 2. The decryption module 141 determines that the decryption key is valid if the received decryption key is the same as a preset decryption key stored in the secured storage system 11.

If the received decryption key is valid, the decryption module 141 decrypts the secured storage system 11 using the received decryption key. The data stored in the secured storage system 11 can be accessed by the user.

In some embodiments, if the encryption key of the encrypted storage system 11 is allowed to be modified and the secured storage system 11 is decrypted, the encryption module 142 further receives a new encryption key and a new decryption key input by the user.

The encryption module 142 encrypts the secured storage system 11 using the new encryption key, and stores the new encryption key and the new decryption key in the secured storage system 11.

Figure 3:
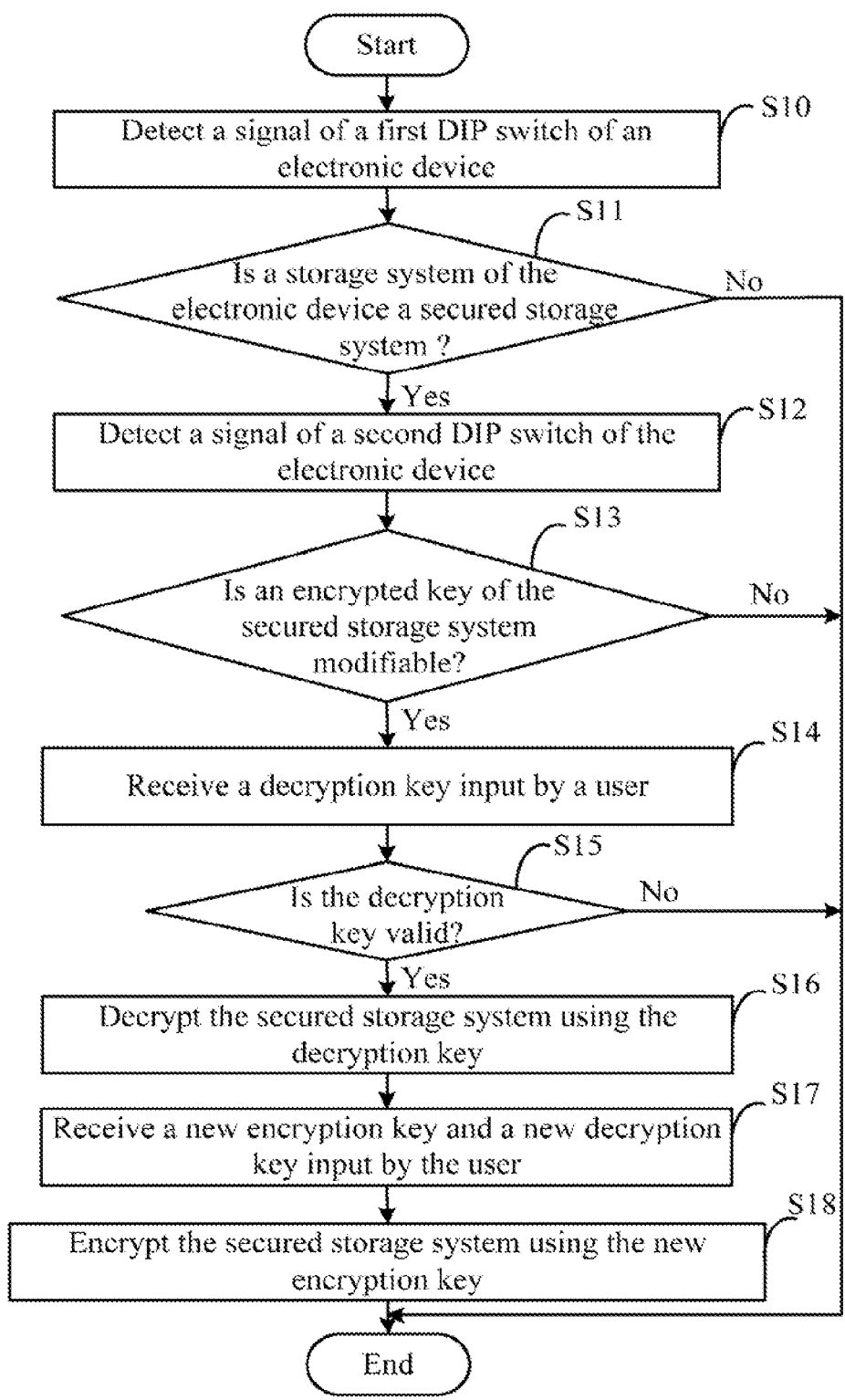
FIG. 3 is a flowchart of one embodiment of a method for security monitoring.

FIG. 3 is a flowchart of one embodiment of a method for security monitoring.

In block S10, the detection module 140 detects a signal of the first DIP switch 120 after the electronic device 1 is started. The signal of the first DIP switch 120 may be a high level signal or a low level signal.

In block S11, the detection module 140 determines whether the storage system 11 is the secured storage system according to the detected signal of the first DIP switch 120. The storage system 11 is the secured storage system if the detected signal of the first DIP switch 120 is the high level signal.

In block S12, the detection module 140 detects a signal of the second DIP switch 121 if the storage system 11 is the secured storage system.

In block S13, the detection module 140 determines whether the encryption key of the secured storage system 11 is modifiable according to the detected signal of the second DIP switch 121. The encryption key of the secured storage system 11 is modifiable if the signal of the second DIP switch 121 is the low level signal. The encryption key of the secured storage system 11 is not modifiable if the signal of the second DIP switch 121 is the high level signal.

In block S14, the decryption module 141 receives a decryption key input by a user to decrypt the secured storage system 11.

In block S15, the decryption module 141 determines whether the received decryption key is valid. The decryption key is valid if the received decryption key is the same as a preset decryption key stored in the secured storage system 11.

In block S16, the decryption module 141 decrypts the secured storage system 11 using the received decryption key if the received decryption key is valid.

In block S17, the encryption module 142 receives a new encryption key and a new decryption key input by the user.

In block S18, the encryption module 142 encrypts the secured storage system 11 using the new encryption key, and stores the new encryption key and the new decryption key in the secured storage system 11.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic device for security monitoring, the electronic device comprising:
   a storage system;
   an integrated circuit comprising a first switch and a second switch, wherein each of the first switch and the second switch provides two signals, the two signals provided by the first switch respectively correspond to a general storage system and a secured storage system, and the two signals provided by the second switch respectively correspond to an encryption key of the secured storage system being modifiable or not modifiable;
   at least one processor; and
   one or more programs stored in the storage system and being executable by the at least one processor, the one or more programs comprising:
   a detection module that determines whether the storage system being the secured storage system according to a detected signal of the first switch, and determines whether the encryption key of the secured storage system being modifiable according to a detected signal of the second switch; and
   a decryption module that decrypts the secured storage system using a decryption key under the condition that the decryption key is the same as a preset decryption key in the secured storage system.

2. The electronic device of claim 1, wherein the two signals provided by the first switch or the second switch comprise a high level signal and a low level signal.

3. The electronic device of claim 2, wherein the detection module determines that the storage system is the secured storage system under the condition that the detected signal of the first switch is the high level signal.

4. The electronic device of claim 2, wherein the detection module determines that the encryption key of the secured storage system is modifiable under the condition that the detected signal of the second switch is the low level signal.

5. The electronic device of claim 1, wherein the one or more programs further comprising:
   an encryption module operable to receive a new encryption key and a new decryption key input by the user.

6. The electronic device of claim 1, wherein the first and second switch are dual in-line package (DIP) switches.

7. A method for security monitoring of an electronic device, the electronic device comprising an integrated circuit and a storage system, the method comprising:
   detecting a signal of a first switch of the integrated circuit, wherein the signal of the first switch corresponds to a general storage system or a secured storage system;
   determining whether the storage system is the secured storage system according to the detected signal of the first switch;
   detecting a signal of a second switch of the integrated circuit if the storage system is the secured storage system, wherein the signal of the second switch corresponds to an encryption key of the secured storage system is modifiable or is not modifiable;
   determining whether the encryption key of the secured storage system is modifiable according to the detected signal of the second switch; and
   decrypting the secured storage system using a decryption key under the condition that the decryption key is the same as a preset decryption key in the secured storage system.

8. The method of claim 7, wherein the signal of the first switch or the second switch is a high level signal or a low level signal.

9. The method of claim 8, wherein the storage system is the secured storage system under the condition that the detected signal of the first switch is the high level signal.

10. The method of claim 8, wherein the encryption key of the secured storage system is modifiable under the condition that the detected signal of the second switch is the low level signal.

11. The method of claim 7, wherein the method further comprising:
   receiving a new encryption key and a new decryption key input by the user.

12. The method of claim 7, wherein the first and second switch are dual in-line package (DIP) switches.

13. A non-transitory storage medium having stored thereon instructions that, when executed by a processor, cause the processor to perform a method for security monitoring of an electronic device, the electronic device comprising an integrated circuit and a storage system, the method comprising:

detecting a signal of a first switch of the integrated circuit, wherein the signal of the first switch corresponds to a general storage system or a secured storage system;

determining whether the storage system is the secured storage system according to the detected signal of the first switch;

detecting a signal of a second switch of the integrated circuit if the storage system is the secured storage system, wherein the signal of the second switch corresponds to an encryption key of the secured storage system is modifiable or is not modifiable;

determining whether the encryption key of the secured storage system is modifiable according to the detected signal of the second switch; and decrypting the secured storage system using a decryption key under the condition that the decryption key is the same as a preset decryption key in the secured storage system.

14. The non-transitory storage medium of claim 13, wherein the signal of the first switch or the second switch is a high level signal or a low level signal.

15. The non-transitory storage medium of claim 14, wherein the storage system is the secured storage system under the condition that the detected signal of the first switch is the high level signal.

16. The non-transitory storage medium of claim 14, wherein the encryption key of the secured storage system is modifiable under the condition that the detected signal of the second switch is the low level signal.

17. The non-transitory storage medium of claim 13, wherein the method further comprising:

receiving a new encryption key and a new decryption key input by the user.

18. The non-transitory storage medium of claim 13, wherein the first and second switch are dual in-line package (DIP) switches.

* * * * *